United States Patent
Mathew et al.

(10) Patent No.: US 9,305,582 B2
(45) Date of Patent: *Apr. 5, 2016

(54) SYSTEMS AND METHODS FOR FLY-HEIGHT CONTROL USING SERVO DATA

(75) Inventors: George Mathew, San Jose, CA (US); Yuan Xing Lee, San Jose, CA (US); Hongwei Song, Longmont, CO (US); Jeffrey P. Grundvig, Loveland, CO (US); Viswanath Annampedu, Schnecksville, PA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 12/663,355

(22) PCT Filed: Oct. 27, 2008

(86) PCT No.: PCT/US2008/081379
§ 371 (c)(1),
(2), (4) Date: Dec. 7, 2009

(87) PCT Pub. No.: WO2009/079093
PCT Pub. Date: Jun. 25, 2009

(65) Prior Publication Data
US 2011/0043938 A1    Feb. 24, 2011

Related U.S. Application Data

(60) Provisional application No. 61/013,658, filed on Dec. 14, 2007.

(51) Int. Cl.
*G11B 21/02* (2006.01)
*G11B 27/36* (2006.01)
*G11B 5/60* (2006.01)
*G11B 5/596* (2006.01)

(52) U.S. Cl.
CPC .......... *G11B 5/6029* (2013.01); *G11B 5/59688* (2013.01)

(58) Field of Classification Search
None
See application file for complete search history.

(56) References Cited

U.S. PATENT DOCUMENTS

| 3,973,182 A | 8/1976 | Kataoka |
| 3,973,183 A | 8/1976 | Kataoka |
| 4,024,571 A | 5/1977 | Dischert et al. |
| 4,777,544 A | 10/1988 | Brown et al. |

(Continued)

OTHER PUBLICATIONS

Annampedu, V. and Aziz, P.M., "Adaptive Algorithms for Asynchronous Detection of Coded Servo Signals Based on Interpolation", IEEE Trans. on Mag., vol. 41, No. 10, Oct. 2005.

(Continued)

*Primary Examiner* — K. Wong

(57) ABSTRACT

Various embodiments of the present invention provide systems and methods for determining changes in fly-height. For example, various embodiments of the present invention provide storage devices that include a storage medium having servo data thereon. A read/write head assembly is disposed in relation to the storage medium. A servo based fly-height adjustment circuit receives the servo data via the read/write head assembly, and calculates a first harmonics ratio based on the received data and compares the first harmonics ratio with a second harmonics ratio to determine an error in the distance between the read/write head assembly and the storage medium.

26 Claims, 4 Drawing Sheets

(56) References Cited

U.S. PATENT DOCUMENTS

| | | |
|---|---|---|
| 5,130,866 A | 7/1992 | Klaassen et al. |
| 5,237,325 A | 8/1993 | Klein et al. |
| 5,278,703 A | 1/1994 | Rub et al. |
| 5,309,357 A | 5/1994 | Stark et al. |
| 5,341,249 A | 8/1994 | Abbott et al. |
| 5,377,058 A | 12/1994 | Good et al. |
| 5,521,948 A | 5/1996 | Takeuchi |
| 5,523,902 A | 6/1996 | Pederson |
| 5,668,679 A | 9/1997 | Swearingen et al. |
| 5,696,639 A | 12/1997 | Spurbeck et al. |
| 5,781,129 A | 7/1998 | Schwartz et al. |
| 5,798,885 A | 8/1998 | Saiki et al. |
| 5,835,295 A | 11/1998 | Behrens |
| 5,844,920 A | 12/1998 | Zook et al. |
| 5,852,524 A | 12/1998 | Glover et al. |
| 5,986,830 A | 11/1999 | Hein |
| 5,987,562 A | 11/1999 | Glover |
| 6,009,549 A | 12/1999 | Bliss et al. |
| 6,023,383 A | 2/2000 | Glover et al. |
| 6,069,583 A | 5/2000 | Silvestrin et al. |
| 6,081,397 A | 6/2000 | Belser |
| 6,111,712 A | 8/2000 | Vishakhadatta et al. |
| 6,208,478 B1 | 3/2001 | Chiu et al. |
| 6,249,393 B1 | 6/2001 | Billings |
| 6,278,591 B1 | 8/2001 | Chang |
| 6,400,518 B1 | 6/2002 | Bhaumik et al. |
| 6,404,829 B1 | 6/2002 | Sonu |
| 6,441,661 B1 | 8/2002 | Aoki et al. |
| 6,490,110 B2 | 12/2002 | Reed et al. |
| 6,493,162 B1 | 12/2002 | Fredrickson |
| 6,519,102 B1 | 2/2003 | Smith |
| 6,530,060 B1 | 3/2003 | Vis et al. |
| 6,603,622 B1 | 8/2003 | Christiansen et al. |
| 6,606,048 B1 | 8/2003 | Sutardja |
| 6,633,447 B2 | 10/2003 | Franck et al. |
| 6,646,822 B1 | 11/2003 | Tuttle et al. |
| 6,657,802 B1 | 12/2003 | Ashley et al. |
| 6,775,529 B1 | 8/2004 | Roo |
| 6,788,484 B2 | 9/2004 | Honma |
| 6,813,108 B2 | 11/2004 | Annampedu et al. |
| 6,816,328 B2 | 11/2004 | Rae |
| 6,839,014 B2 | 1/2005 | Uda |
| 6,856,183 B2 | 2/2005 | Annampedu |
| 6,876,511 B2 | 4/2005 | Koyanagi |
| 6,912,099 B2 | 6/2005 | Annampedu et al. |
| 6,963,521 B2 | 11/2005 | Hayashi |
| 6,999,257 B2 | 2/2006 | Takeo |
| 6,999,264 B2 | 2/2006 | Ehrlich |
| 7,002,767 B2 | 2/2006 | Annampedu et al. |
| 7,038,875 B2 | 5/2006 | Lou et al. |
| 7,072,137 B2 | 7/2006 | Chiba |
| 7,082,005 B2 | 7/2006 | Annampedu et al. |
| 7,092,462 B2 | 8/2006 | Annampedu et al. |
| 7,116,504 B1 | 10/2006 | Oberg |
| 7,126,776 B1 | 10/2006 | Warren, Jr. et al. |
| 7,136,250 B1 | 11/2006 | Wu et al. |
| 7,154,689 B1 | 12/2006 | Shepherd et al. |
| 7,167,328 B2 | 1/2007 | Annampedu et al. |
| 7,180,693 B2 | 2/2007 | Annampedu et al. |
| 7,187,739 B2 | 3/2007 | Ma |
| 7,191,382 B2 | 3/2007 | James et al. |
| 7,193,544 B1 | 3/2007 | Fitelson et al. |
| 7,193,798 B2 | 3/2007 | Byrd et al. |
| 7,199,961 B1 | 4/2007 | Wu et al. |
| 7,203,013 B1 | 4/2007 | Han et al. |
| 7,206,146 B2 | 4/2007 | Flynn et al. |
| 7,253,984 B1 | 8/2007 | Patapoutian et al. |
| 7,301,717 B1 | 11/2007 | Lee et al. |
| 7,308,057 B1 | 12/2007 | Patapoutian |
| 7,362,536 B1 | 4/2008 | Liu et al. |
| 7,375,918 B1 | 5/2008 | Shepherd et al. |
| 7,411,531 B2 | 8/2008 | Aziz et al. |
| 7,420,498 B2 | 9/2008 | Barrenscheen |
| 7,423,827 B2 | 9/2008 | Neville et al. |
| 7,440,224 B2 * | 10/2008 | Ehrlich et al. .............. 360/77.08 |
| 7,446,690 B2 | 11/2008 | Kao |
| 7,499,238 B2 | 3/2009 | Annampedu |
| 7,522,360 B2 | 4/2009 | Imamura et al. |
| 7,620,101 B1 | 11/2009 | Jenkins |
| 7,715,135 B1 * | 5/2010 | Sutardja et al. ................. 360/40 |
| 7,835,104 B2 | 11/2010 | Yamashita et al. |
| 7,872,821 B2 * | 1/2011 | Grundvig et al. .............. 360/25 |
| 8,098,451 B2 * | 1/2012 | Graef ............................... 360/75 |
| 2002/0001151 A1 | 1/2002 | Lake |
| 2002/0150179 A1 | 10/2002 | Leis et al. |
| 2002/0176185 A1 | 11/2002 | Fayeulle et al. |
| 2002/0181377 A1 | 12/2002 | Nagata et al. |
| 2003/0095350 A1 | 5/2003 | Annampedu et al. |
| 2005/0046982 A1 | 3/2005 | Liu et al. |
| 2005/0157415 A1 | 7/2005 | Chiang |
| 2005/0243455 A1 | 11/2005 | Annampedu |
| 2007/0071152 A1 | 3/2007 | Chen et al. |
| 2007/0104300 A1 | 5/2007 | Esumi et al. |
| 2007/0183073 A1 | 8/2007 | Sutardja et al. |
| 2007/0230015 A1 | 10/2007 | Yamashita |
| 2007/0263311 A1 | 11/2007 | Smith |
| 2007/0268615 A1 | 11/2007 | McFaden |
| 2008/0080082 A1 | 4/2008 | Erden et al. |
| 2008/0266693 A1 | 10/2008 | Bliss et al. |
| 2009/0002862 A1 | 1/2009 | Park |
| 2009/0142620 A1 | 6/2009 | Yamamoto et al. |
| 2010/0177430 A1 * | 7/2010 | Mathew et al. ................. 360/75 |

OTHER PUBLICATIONS

Aziz and Annampedu, "Asynchronous Maximum Likelihood (ML) Detection of Servo repeatable Run Out (RRO) Data".

Aziz & Annampedu, "Interpolation Based Maximum-Likelihood(ML) Detection of Asynchronous Servo Repeatable Run Out (RRO) Data", IEEE Int. Mag. Con., vol. 42, No. 10, Oct. 2006.

* cited by examiner

SYSTEMS AND METHODS FOR FLY-HEIGHT CONTROL USING SERVO DATA

CROSS REFERENCE TO RELATED APPLICATIONS

The present application claims priority to (is a non-provisional of) U.S. Pat. App. No. 61/013,658 entitled "A Resynchronization Approach for Harmonic Estimation Using Half-Rate Preamble", and filed Dec. 14, 2007 by Mathew et al. The entirety of the aforementioned application is incorporated herein by reference for all purposes.

BACKGROUND OF THE INVENTION

The present inventions are related to systems and methods for accessing a storage medium, and more particularly to systems and methods for determining the location of a read/write head assembly in relation to a storage medium.

Writing information to a magnetic storage medium includes generating a magnetic field in close proximity to the storage medium to be written. This may be done using a read/write head assembly as are commonly known in the art, and is highly dependent on properly positioning the read/write head assembly in relation to a magnetic storage medium. The distance between the read/write head assembly and the storage medium is commonly referred to as fly-height. Proper control of the fly-height helps to assure that the read back signal exhibits the best possible signal-to-noise ratio, and thereby improves performance. In a typical implementation, fly-height is determined based on harmonic measurements during a non-operational period. Such an approach uses a vacant or dedicated area on the magnetic storage medium to write a periodic pattern from which the harmonics may be measured. While the approach provides a reasonable static estimate of fly-height, it does not provide an indication of any change in fly-height occurring during standard operational periods. As such, the approaches do not provide an ability to adjust for changes occurring during the operation of the disk. Other approaches use channel bit density (CBD) estimation to determine fly-height. This approach relies on estimating the CBD from various ADC samples by means of a de-convolution approach. This is based on truncating the correlation-length of the channel impulse response, and approximating the channel impulse response by the dipulse (bit) response. The de-convolution requires matrix inversion, and it becomes very difficult to implement the matrix inversion as the matrix size increases, which it does as the truncation length of the channel correlation is relaxed. It is also difficult to use this approach to obtain the CBD variation in continuous fashion, as it works on a block by block basis. Yet other approaches use an available AGC signal for inferring the fly-height. Such an approach is able to continuously monitor fly-height during normal operational periods, however, the accuracy of the approach is significantly diminished due to PVT-induced variations in the signal/circuits. More importantly, none of the aforementioned approaches facilitate fly-height monitoring and control during normal write operations.

Hence, for at least the aforementioned reasons, there exists a need in the art for advanced systems and methods for determining fly-height.

BRIEF SUMMARY OF THE INVENTION

The present inventions are related to systems and methods for accessing a storage medium, and more particularly to systems and methods for determining the location of a read/write head assembly in relation to a storage medium.

Various embodiments of the present invention provide storage devices. Such storage devices include a storage medium having servo data thereon. A read/write head assembly is disposed in relation to the storage medium. A servo based fly-height adjustment circuit receives the servo data via the read/write head assembly, and calculates a first harmonics ratio based on the received data and compares the first harmonics ratio with a second harmonics ratio to determine an error in the distance between the read/write head assembly and the storage medium.

In some instances of the aforementioned embodiments, the servo data includes a preamble pattern. In such instances, the servo based fly-height adjustment circuit receives at least a first sample set corresponding to the preamble pattern and a second sample set corresponding to the preamble pattern. Calculating the first harmonics ratio includes: averaging at least the first sample set and the second sample set to create an averaged sample set; calculating at least two harmonics based on the averaged sample set; and calculating a ratio of the two harmonics. In some cases, calculating the at least two harmonics based on the averaged sample set includes performing a discrete Fourier transform. In one or more cases, the preamble pattern is a 4T preamble pattern (i.e., a half rate preamble) and the averaged sample set includes eight samples. In such cases, one of the two harmonics is a first harmonic and the other is a third harmonic. In such cases, calculating the first harmonics ratio includes calculating a ratio of either the first harmonic to the third harmonic or the third harmonic to the first harmonic.

In some cases the samples used to create the averaged sample set are derived from two or more different sectors on the storage medium. In some instances of the aforementioned embodiments, the servo based fly-height adjustment circuit includes a digital phase lock loop circuit that adjusts the phase of a sampling clock to synchronize the sampling clock to a received data stream. In such cases, some of the samples used to create the averaged sample set may be derived from data sampled before a sampling clock is synchronized to an input data stream. This may be done by interpolating the data using a phase difference between a sampling clock originally used to sample the data and the synchronized sampling clock.

Other embodiments of the present invention provide methods for identifying a distance error based on servo data. Such methods include: providing a first harmonic ratio corresponding to a known position; providing a storage medium that includes servo data; accessing the servo data from the storage medium using a read/write head assembly; calculating a second harmonic ratio based on the servo data; and comparing the first harmonic ratio with the second harmonic ratio to determine a distance error. In some instances of the aforementioned embodiments, the first harmonic ratio is calculated during an initialization phase and corresponds to a know fly-height. In some instances of the aforementioned embodiments, the methods further include adjusting a distance from the read/write head assembly to the storage medium such that the distance error is reduced.

In various instances of the aforementioned embodiments, the servo data includes a preamble pattern. Accessing the servo data from the storage medium using a read/write head assembly includes performing an analog to digital conversion where at least a first sample set corresponding to the preamble pattern and a second sample set corresponding to the preamble pattern are created. Calculating the second harmonics ratio includes: averaging at least the first sample set and the second sample set to create an averaged sample set; calculating at least two harmonics based on the averaged sample set; and calculating a ratio of the two harmonics. In some cases, calculating the at least two harmonics based on the averaged sample set includes performing a discrete Fourier transform. In various cases, the preamble pattern is a 4T preamble pattern and the averaged sample set includes eight samples. One of the at least two harmonics is a first harmonic and another of the at least two harmonics is a third harmonic. Calculating the second harmonics ratio includes calculating a ratio of the first harmonic to the third harmonic, or calculating a ratio of the third harmonic to the first harmonic. In one or more cases, the first sample set is derived from a preamble pattern in a first sector, and the second sample set is derived from a preamble pattern in a second sector.

In some instances of the aforementioned embodiments, the methods further include synchronizing a sampling clock to the servo data. In such cases, the first sample set may be derived by interpolating the servo data received before the sampling clock is synchronized. In such cases, the second sample set may be derived directly from the servo data sampled using the sampling clock.

Yet other embodiments of the present invention provide servo based fly-height adjustment circuits. Such circuits include a memory that maintains a first sample set corresponding to a first portion of a preamble pattern. In addition, a second sample set corresponding to a second portion of the preamble pattern is obtained. An interpolation circuit is included that is operable to interpolate the first sample set to a phase position approximately equivalent to the second sample set. A sample averaging circuit receives at least the first sample set and the second sample set, performs an averaging calculation, and provides an averaged sample set. A discrete Fourier transform circuit receives the averaged sample set and calculates at least one harmonic, and a comparator compares the at least one harmonic with a previously calculated harmonic value to yield a distance error. In such cases, a comparison of one harmonic with an earlier calculated harmonic may be used to generate a distance error. Alternatively, two harmonics may be combined in a harmonics ratio and compared with an earlier determined harmonics ratio to determine a distance error.

In some instances of the aforementioned embodiments, the at least one harmonic is a first harmonic and the previously calculated harmonic value is a previously calculated harmonics ratio. In such cases, the discrete Fourier transform circuit further calculates a second harmonic. A harmonics ratio calculator is included that is operable to calculate a newly calculated harmonics ratio of the first harmonic to the second harmonic. The aforementioned first harmonic is one non-zero harmonic (e.g., the first harmonic, third harmonic, etc . . . ), and the aforementioned second harmonic is another non-zero harmonic (e.g., the first harmonic, third harmonic, etc . . . ). Comparing the at least one harmonic with the previously calculated harmonic value includes comparing the newly calculated harmonics ratio to the previously calculated harmonics ratio. In one or more instances, the circuit further include a phase lock loop circuit that is operable to synchronize a sampling clock to the servo data. In such cases, the first sample set corresponding to the preamble pattern may be obtained before the sampling clock is synchronized.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for accessing a storage medium, and more particularly to systems and methods for determining the location of a read/write head assembly in relation to a storage medium.

Various embodiments of the present invention provide the capability to monitor and/or adjust the fly-height using data received from the servo data distributed on a storage medium. In some instances of the aforementioned embodiments, fly-height control is performed based upon samples corresponding to a preamble field of the servo data. In some cases, only samples of the preamble field received after adjustment of the phase and frequency of a sampling clock is completed are used. In such cases, processing may extend across many sectors before a sufficient number of samples are received. In various instances of the aforementioned embodiments, samples received before the phase and/or frequency of the sampling clock is fully established are stored to a buffer. Once the phase and frequency are established, the earlier stored samples can be interpolated and used as part of the fly-height control. By doing such, fly-height control may be accomplished using servo data from fewer sectors. As just some advantages of embodiments of the present invention, special patterns designed to perform fly-height control are not necessary. This results in a reduction in control information that is required on a storage medium and a corresponding increase in usable storage area on the storage medium. Further, using such approaches, monitoring and control of fly-height may be done in parallel to standard read and write accesses to the storage medium as the information used to perform fly-height control is also accessed during such reads and writes. Based on the disclosure provided herein, one of ordinary skill in the art will recognize a variety of other advantages that may be achieved through implementation of different embodiments of the present invention.

Figure 1:
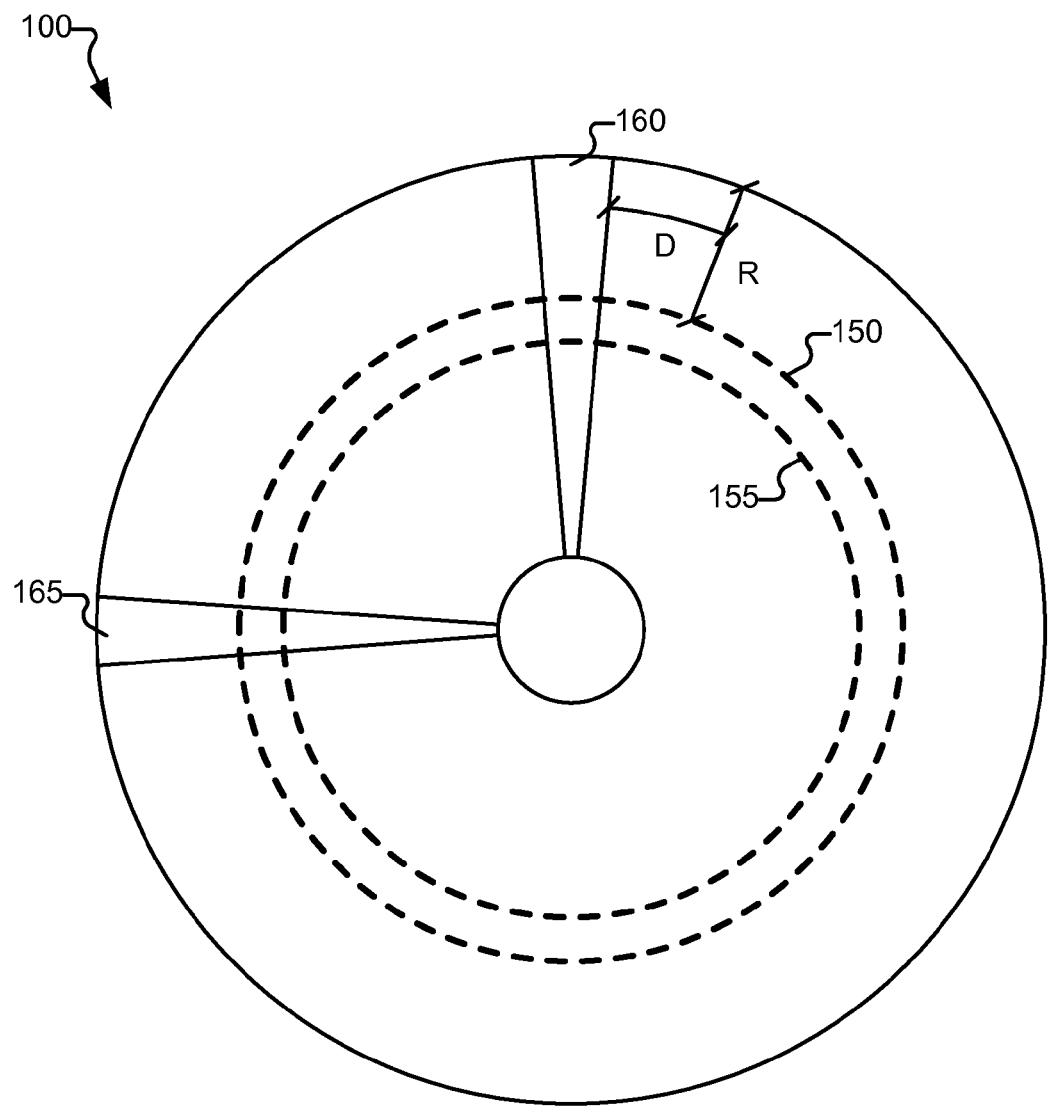
FIG. 1 depicts an existing storage medium including servo data.

FIG. 1 shows a storage medium 100 with two exemplary tracks 150, 155 indicated as dashed lines. The tracks have embedded servo data written within wedges 160, 165 (these wedges may be referred to herein servo sectors or sectors). These wedges include a servo data pattern 110 that is used for control and synchronization of the read/write head assembly over a desired location on storage medium 100. In particular, these wedges generally include a preamble pattern 152 followed by a servo address mark 154 (SAM). Servo address mark 154 is followed by a Gray code 156, and Gray code 156 is followed by burst information 158. It should be noted that while two tracks and two wedges are shown, hundreds of each would typically be included on a given storage medium. Further, it should be noted that a servo data set may have two or more fields of burst information. In some cases, spacers may be disposed between one or more of preamble pattern 152, servo address mark 154, Gray code 156 and/or burst information 158.

In operation, data from storage medium 100 is provided to a read channel circuit (not shown) as a serial stream. The read channel circuit operates to detect preamble pattern 152. Preamble pattern 152 exhibits a particular phase and frequency. This phase and frequency information is used to recover a sampling clock that is used to sample the remaining portion of servo data pattern 110. In particular, servo address mark 154 is identified and the location thereof is used to time the location of Gray code 156 and burst information 158.

Figure 2A:
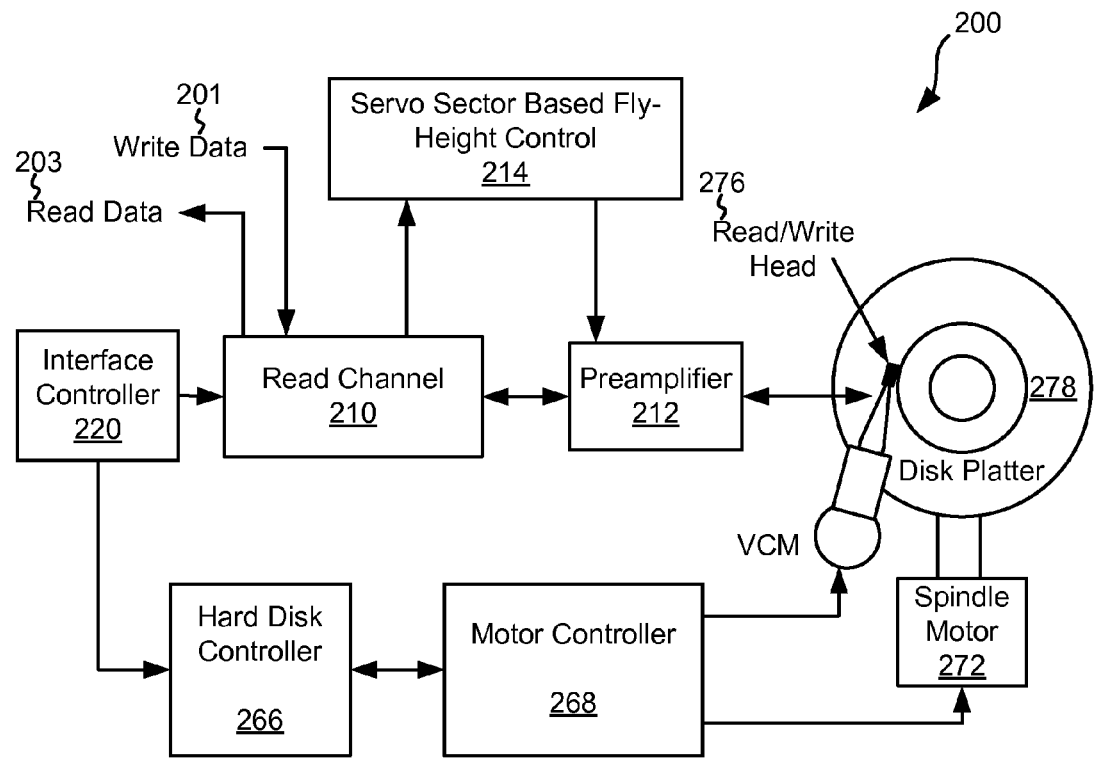
FIG. 2A depicts a storage device including a read channel with a servo based fly-height control circuit in accordance with one or more embodiments of the present invention.

Turning to FIG. 2, a storage system 200 including a servo sector based fly-height control circuit 214 is shown in accordance with various embodiments of the present invention. Storage system 200 may be, for example, a hard disk drive. In addition, storage system 200 includes an interface controller 220, a preamplifier 212, a hard disk controller 266, a motor controller 268, a spindle motor 272, a disk platter 278, and a read/write head assembly 276. Interface controller 220 controls addressing and timing of data to/from disk platter 278. The data on disk platter 278 consists of groups of magnetic signals that may be detected by read/write head assembly 276 when the assembly is properly positioned over disk platter 278. In a typical read/write operation, read/write head assembly 276 is accurately positioned by motor controller 268 over a desired data track on disk platter 278. Motor controller 268 both positions read/write head assembly 276 in relation to disk platter 278 and drives spindle motor 272 by moving read/write head assembly to the proper data track on disk platter 278 under the direction of hard disk controller 266. Spindle motor 272 spins disk platter 278 at a determined spin rate (RPMs). A read channel circuit 210 receives information from preamplifier 212 and performs a data decode/detection process as is known in the art to recover the data originally written to disk platter 278 as read data 203. In addition, read channel circuit 210 receives write data 201 and provides it to preamplifier 212 in a form writable to disk platter 278 as is known in the art.

Figure 2B:
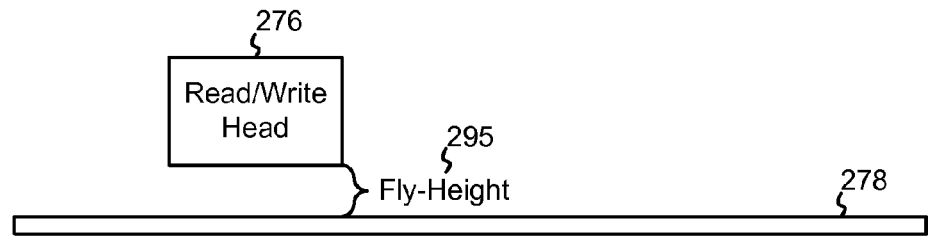
FIG. 2B depicts the read/write head assembly of FIG. 2A disposed in relation to the disk platter of FIG. 2A.

Servo sector based fly-height compensation circuit 214 receives an analog to digital conversion of the data from preamplifier 212. From this information, servo sector based fly-height compensation circuit 214 utilizes a 4T preamble that exhibits at least two harmonics to yield a fly-height adjustment value. FIG. 2B depicts an exemplary fly-height 295, which is the distance between read/write head assembly 276 and disk platter 278. In some embodiments of the present invention, servo sector based fly-height compensation circuit 214 is implemented consistent with the circuit described below in relation to FIG. 3.

In operation, read/write head assembly 278 is positioned adjacent the proper data track, and magnetic signals representing data on disk platter 278 are sensed by read/write head assembly 276 as disk platter 278 is rotated by spindle motor 272. The sensed magnetic signals are provided as a continuous, minute analog signal representative of the magnetic data on disk platter 278. This minute analog signal is transferred from read/write head assembly 276 to read channel circuit 210 via preamplifier 212. Preamplifier 212 is operable to condition the minute analog signals accessed from disk platter 278. In addition, preamplifier 212 is operable to condition data from read channel circuit 210 that is destined to be written to disk platter 278. In turn, read channel circuit 210 decodes and digitizes the received analog signal to recreate the information originally written to disk platter 278. This data is provided as read data 203 to a receiving circuit. A write operation is substantially the opposite of the preceding read operation with write data 201 being provided to read channel module 210. This data is then encoded and written to disk platter 278. During the read and write processes (or during an offline time period), servo sector based fly-height compensation circuit 214 receives the preamble pattern. The preamble pattern is analyzed to yield at least two non-zero harmonics using a discrete Fourier transform. A ratio between the two harmonics is calculated, and the calculated ratio is compared with a previously determined ratio to detect any change. The previously determined ratio is associated with a known fly-height, and as such, the detected change corresponds to a change in fly-height. Based on the detected change a corresponding fly-height adjustment value is calculated and applied. In operation, the aforementioned fly-height adjustment operates to reduce the detected change. Of interest, servo sector based fly-height compensation circuit 214 provides for closed loop fly-height control during either or both of a standard read process and a standard write process.

Figure 3:
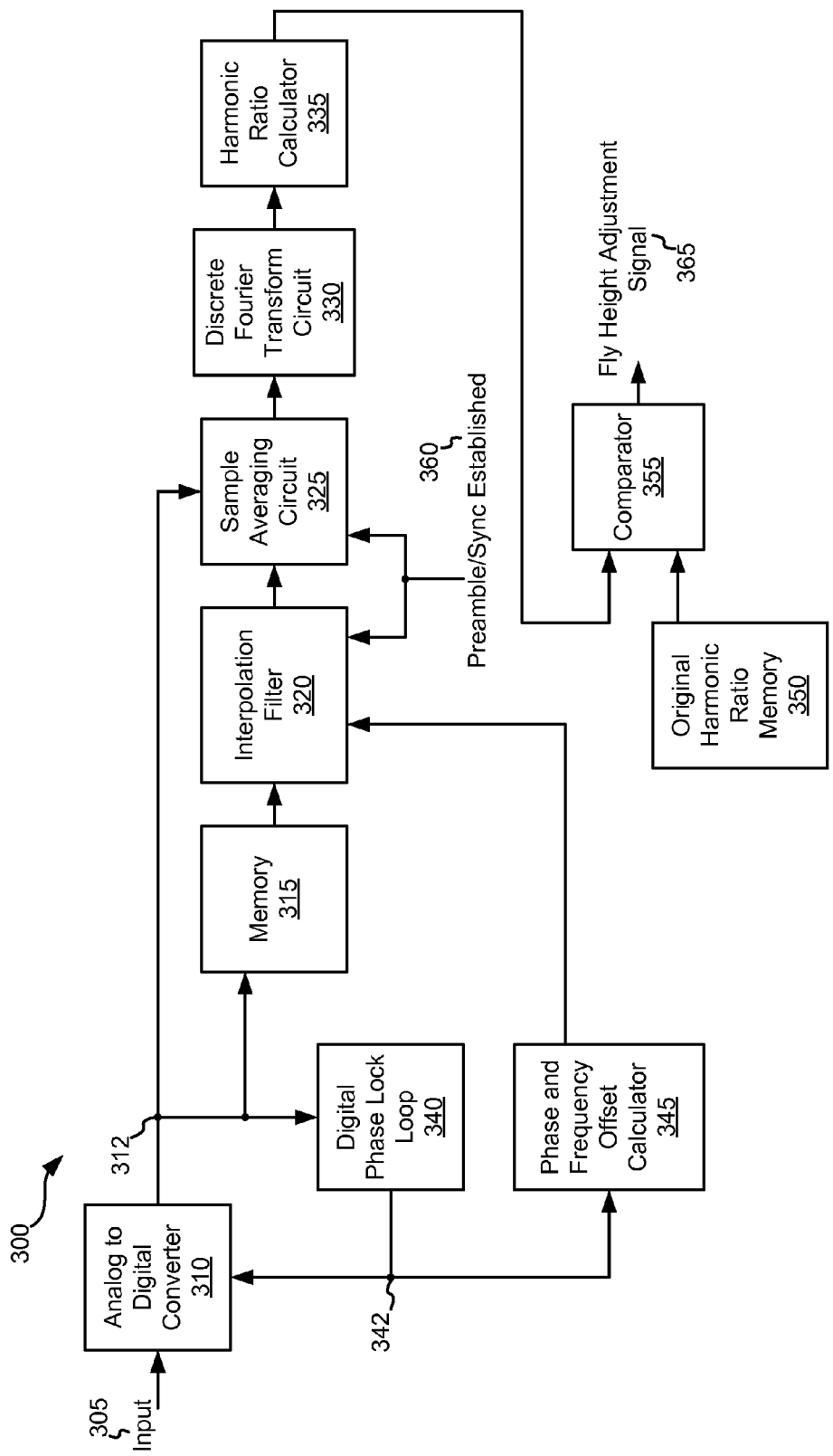
FIG. 3 depicts a portion of a data processing circuit that includes a servo based fly-height control circuit in accordance with one or more embodiments of the present invention.

Turning to FIG. 3, a data processing circuit 300 including a servo based fly-height control circuit is depicted in accordance with one or more embodiments of the present invention. In addition to the servo based fly-height control circuit, data processing circuit 300 includes an analog to digital converter 310 and a digital phase lock loop circuit 340. The included servo based fly-height control circuit includes a memory 315, a phase/frequency offset calculator 345, an interpolation filter 320, a sample averaging circuit 325, a discrete Fourier transform circuit 330, a harmonic ratio calculator circuit 335, original harmonic ratio memory 350, and a comparator 355. Analog to digital converter 310 receives an input 305. Analog to digital converter 310 may be any analog to digital converter that is capable of receiving an analog input, and sampling the analog input based on a sampling clock 342. Based on the disclosure provided herein one of ordinary skill in the art will recognize a variety of analog to digital converters that may be used in accordance with different embodiments of the present invention. The sampling process produces a series of digital samples 312 corresponding to input 305. In some cases, input 305 is derived from a read/write head assembly (not shown) that senses information from a magnetic storage medium. The sensed information is converted to input 305 by an analog front end circuit (not shown) in the read channel. Based on the disclosure provided herein, one of ordinary skill in the art will recognize a variety of potential sources of input 305.

Digital samples 312 are provided to a digital phase lock loop circuit 340. Digital phase lock loop circuit 340 is operable to adjust the phase and/or frequency of sampling clock 342 based upon digital samples 312. In some cases, digital phase lock loop circuit 340 includes a detector that is operable to detect a preamble pattern from which phase and/or frequency information is derived. This may be done using any process known in the art for recovering a clock from a received data stream. For example, digital phase lock loop circuit 340 may be implemented consistent with preamble detector and clock recovery circuits used in existing hard disk drive systems. At the same time, digital samples 312 are stored to a memory 315. Memory 315 may be any type of memory. In some embodiments of the present invention, memory 315 is a random access memory. In particular embodiments of the present invention, the random access memory is arranged as a FIFO memory.

Sampling clock 342 is provided to a phase and frequency offset calculator circuit 345. Phase and frequency offset calculator 345 is operable to identify a phase offset for each sample stored in memory 315. The phase offset is a phase difference between the instance of sampling clock 342 that was used to sample the particular one of digital samples 312 and the synchronized instance of sampling clock 342. For example, after processing a number of instances of digital samples 312, sampling clock 342 may be considered synchronized to input 305. During this process, the phase of sampling clock 342 may move a number of degrees, x (i.e., a phase offset), from when the first sample of digital samples 312 is stored to memory 315 until sampling clock 342 is synchronized. The value of the phase offset, x, may be calculated in accordance with the following derived equations. First, the error is defined by the following equation:

$$e(n) = \phi(n) - \hat{\phi}(n),$$

where $\phi(n)$ is the phase of sampling clock 342, and n is an integer designating a particular sample of the preamble pattern. $\hat{\phi}(n)$ is defined by the following equation:

$$\hat{\phi}(n) = \phi_0 + nf_0,$$

where $\phi_0$ is the initial phase offset from $\phi$ and $f_0$ is the initial frequency offset. The average of the phase after synchronization is achieved (i.e., from $n_1$ to $n_2$) is defined by the following equation:

$$\check{\phi}(n_1, n_2) = \frac{1}{n_2 - n_1 + 1} \sum_{n=n1}^{n2} \phi(n)$$
$$= \phi_0 + \frac{f_0}{n_2 - n_1 + 1} \sum_{n=n1}^{n2} n$$
$$= \phi_0 + \frac{n_1 + n_2}{2}.$$

In this equation, $n_1$ is the sample corresponding to the point where sampling clock 342 is considered synchronized, and $n_2$ is a later sample of the preamble received after the synchronizing process is completed. Based on this equation, $\phi_0$ and $f_0$ can be estimated using the following equations:

$$\hat{f}_0 = \frac{2}{n_2 - n_1 + 1} \sum_{n=(n1+1)/2}^{n2/2} [\phi(2n) - \phi(2n-1)], \text{ and}$$
$$\hat{\phi}_0 = \check{\phi}(n_1, n_2) - \hat{f}_0 \frac{n_1 + n_2}{2}.$$

In one particular embodiment of the present invention, the values for $n_1$ and $n_2$ are 66 and 104, respectively. Substituting the aforementioned, the value for the phase offset may be calculated in accordance with the following equation:

Phase Offset=$\phi(n) - [\hat{\phi}_0 + n\hat{f}_0]$, for $n=1, 2, \ldots, n_3$, where $n_3$ is less than $n_1$.

The calculated phase offset value, x, is provided to an interpolation filter 320 that interpolates the first sample to make it consistent with later samples that were sampled using the synchronized instances of sampling clock 342. Interpolation filter 320 may be any circuit known in the art that is capable of interpolating a received sample to correspond with a determined phase. A different phase offset value (corresponding to a different value of n) is determined for each of the respective samples of digital samples 312 that are generated before sampling clock 342 is synchronized. Thus, for example, the phase of sampling clock 342 may move a number of degrees, y, from when the other sample of digital samples 312 is stored to memory 315 until sampling clock 342 is synchronized. Similarly, the value y is provided to an interpolation filter 320 that interpolates the other sample to make it consistent with later samples that were sampled using the synchronized instance of sampling clock 342. This interpolation process may be applied to a number of samples received prior to synchronizing sampling clock 342.

The synchronization status of sampling clock 342 is indicated by a preamble/sync established signal 360. Preamble/sync established signal 360 is asserted by digital phase lock loop circuit 340 when the feedback error of the loop goes below a defined threshold. Once sampling clock 342 is synchronized, digital samples 312 sampled by the synchronized sampling clock 342 are provided directly to a sample averaging circuit 325 where a running average is calculated. In addition, samples that have been interpolated using interpolation filter 320 are provided to sample averaging circuit 325 where they are incorporated into the running average as well. The averaging process may be done on a period by period basis. Thus, for example, where a 4T preamble pattern is employed (i.e., a repeating eight position pattern of ++++----), the running average may include eight averaged samples—one for each position. An example of this averaging is provided below in relation to FIG. 4.

Once enough samples have been incorporated in the running average, the running average samples are provided to a discrete Fourier transform circuit 330. Discrete Fourier transform circuit 330 calculates two or more harmonics associated with the received samples. In the case of a 4T preamble pattern (i.e., a half-rate preamble), the eight received samples are capable of yielding four harmonics. The first harmonic and third harmonic are non-zero and are useful in creating a ratio from which an error in the fly-height may be determined. Thus, in some cases where a 4T preamble is used, only the first harmonic and the third harmonic are calculated. The calculated harmonics are provided to a harmonic ratio calculation circuit 335 that calculates a defined harmonic ratio. Using the 4T preamble example, the harmonics ratio may be calculated in accordance with either of the following two equations:

$$\text{Calculated Harmonics Ratio} = \log\left(\frac{\text{first harmonic}}{\text{third harmonic}}\right); \text{ or}$$

$$\text{Calculated Harmonics Ratio} = \log\left(\frac{\text{third harmonic}}{\text{first harmonic}}\right).$$

A corresponding original harmonics ratio was determined at startup and stored to a memory 350. The original harmonics ratio is calculated is a similar way, but is calculated when the read/write head assembly is a known distance from the storage medium (i.e., the original harmonics ratio corresponds to a known fly-height value). The newly calculated harmonics ratio is compared with the previously stored original harmonics ratio using a comparator circuit 355. The output of comparator circuit 355 is a fly-height adjustment signal 365 that exhibits a value as defined by the following equation:

fly height adjustment signal=Original Harmonics Ratio−Calculated Harmonics Ratio.

When the fly-height is correct, fly-height adjustment signal 365 is approximately zero. Thus, any fly-height adjustment is done by driving the value of fly-height adjustment signal 365 to zero.

Figure 4:
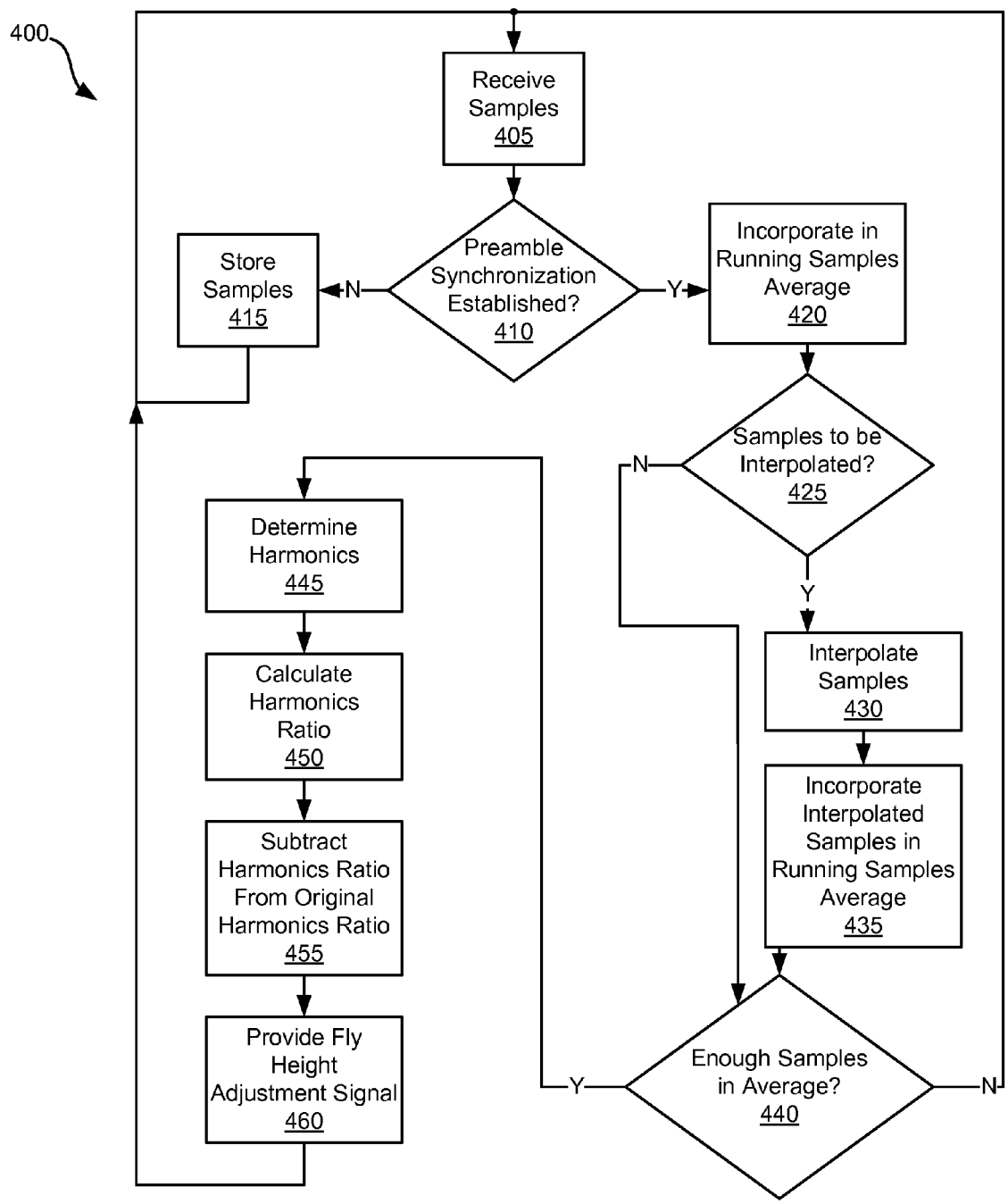
FIG. 4 is a flow diagram showing a method in accordance with various embodiments of the present invention for providing fly-height control using servo data.

Turning to FIG. 4, a flow diagram 400 depicts a method in accordance with various embodiments of the present invention for providing fly-height control using servo data. Following flow diagram 400, a series of digital samples are received (block 405). The series of digital samples may correspond to an analog data stream derived from a storage medium. The series of digital samples are queried for the presence of a preamble pattern (block 410). In some cases, the preamble pattern is a 4T preamble pattern (i.e., a half-rate preamble pattern) which includes a number of instances of four positive samples followed by four negative samples (e.g., ++++−−−−++++−−−−++++−−−− . . . ). A standard synchronization is performed using the identified preamble pattern. Such synchronization includes adjusting the phase and/or frequency of a sampling clock and adjusting any gain factors as is known in the art.

Until the preamble synchronization is completed (block 410), samples corresponding to the preamble are stored to a buffer (block 415). This may include storing all samples in a memory and once the synchronization is complete, indicating which of the stored samples in the memory correspond to the preamble pattern. As discussed below, these samples may be interpolated after the synchronization process is completed to create additional samples usable for performing fly-height control. At some point in the preamble pattern the synchronization process completes (block 410). Once this synchronization process completes (i.e., the sampling clock is synchronized to the phase and frequency of the input data stream), the remaining samples corresponding to the preamble pattern are considered usable without additional interpolation and as such are incorporated into a running average of reliable preamble samples (block 420). Averaging may be done on a period by period basis. For example, where a 4T preamble pattern is employed (i.e., a repeating eight position pattern of ++++−−−−), the running average may include eight averaged samples (i.e., one for each position). As a particular example, a first set of eight samples corresponding to a ++++−−−− may include eight sample values of 0.75, 0.81, 1.11, 0.90, −0.70, −0.90, −1.15, −0.90; and a subsequent set of eight samples corresponding to a ++++−−−− may include eight sample values of 0.75, 0.83, 1.05, 0.90, −0.78, −0.90, −1.09, −0.90. In such a case, the running average would include an average of each of the eight sample positions corresponding to the ++++−−−−, or 0.75, 0.82, 1.08, 0.90, −0.74, −0.90, −1.12, −0.90. Each subsequent set of eight samples corresponding to a ++++−−−− is averaged into the current running average. For example, if a third set of eight samples corresponding to a ++++−−−− is 0.75, 0.84, 1.08, 0.90, −0.76, −0.90, −1.12, −0.90, the resulting running average would be 0.75, 0.83, 1.08, 0.90, −0.75, −0.90, −1.12, −0.90. It should be noted that the aforementioned numbers are merely exemplary and that any values are possible depending upon the particular implementation that is chosen.

It is then determined whether any samples that were buffered in block 415 may now be interpolated and used (block 425). Where there are some samples that may be interpolated (block 425), those samples are retrieved from the memory where they were previously stored (block 415) and are interpolated (block 430). This interpolation includes creating one or more samples that are adjusted in time to include the phase and/or frequency adjustment applied to the sampling clock. Such interpolation may be done using any technique known in the art for interpolation. Having been interpolated, the samples are considered reliable and are incorporated into the running average (block 435). The samples are incorporated into the running average in the same way as other previously incorporated samples. It should be noted that the running average of samples may include samples from a preamble pattern derived from two or more sectors, from data samples obtained prior to synchronization of the sampling clock, and/or from data samples obtained after synchronization of the sampling clock.

It is then determined whether a sufficient number of reliable preamble samples have been gathered to allow for a reliable harmonics calculation (block 440). In one particular embodiment of the present invention, the number of periods obtained before harmonics are calculated is two-hundred. Where the number of reliable samples is insufficient (block 440), the next servo data from which samples are received is awaited (block 405, 410). Otherwise, where there are sufficient samples (block 440), at least two harmonics are calculated based on the averaged samples (block 445). In the case of a 4T preamble, four harmonics are possible with the first and third harmonics being non-zero values. In this case, the first harmonic and third harmonic are calculated. The harmonics may be calculated using a discrete Fourier transform as is known in the art.

Two of the non-zero harmonics are then used to calculate a harmonics ratio (block 450). Thus, using the preceding example where the preamble is a 4T pattern and the first harmonic and third harmonic are non-zero, the harmonics ratio may be calculated in accordance with either of the following two equations:

$$\text{Calculated Harmonics Ratio} = \log\left(\frac{\text{first harmonic}}{\text{third harmonic}}\right); \text{or}$$

$$\text{Calculated Harmonics Ratio} = \log\left(\frac{\text{third harmonic}}{\text{first harmonic}}\right).$$

At some point during setup or initialization of the storage device, a corresponding ratio was defined along with an ideal fly-height associated with the ratio is determined (e.g., an original harmonics ratio). For example, when a storage device is powered on, fly-height may be adjusted using any approach known in the art. Once this ideal fly-height is established, the processes of preamble synchronization and harmonic ratio calculation are performed for this initial state (block 405-block 450).

The newly calculated harmonics ratio (block 450) is subtracted from the originally calculated harmonics ratio to yield an error in accordance with the following equation:

error=Original Harmonics Ratio−Calculated Harmonics Ratio.

This error is provided as a fly-height adjustment signal to a fly-height controller (block 460). The fly-height controller operates as a closed loop adjustment and modifies the fly-height such that the error is driven toward zero.

In conclusion, the invention provides novel systems, devices, methods and arrangements for performing fly-height control based on servo data. While detailed descriptions of one or more embodiments of the invention have been given above, various alternatives, modifications, and equivalents will be apparent to those skilled in the art without varying from the spirit of the invention. For example, a full rate preamble (i.e., a 2T preamble corresponding to pattern ++−−)

may be used. In such a case, only a single harmonic is calculated. This single harmonic is compared directly with a corresponding harmonic that was originally calculated when the fly-height was known. As will be appreciated, where the harmonics (newly calculated and originally calculated) are compared directly to create the fly-height adjustment signal, a harmonics ratio is not needed. Therefore, the above description should not be taken as limiting the scope of the invention, which is defined by the appended claims.

What is claimed is:

1. A storage device, the storage device comprising:
a storage medium configured to store servo data;
a read/write head assembly disposed in relation to the storage medium; and
a servo based fly-height adjustment circuit operable to:
receive at least a first sample set corresponding to the servo data and a second sample set corresponding to the servo data via the read/write head assembly;
average at least the first sample set and the second sample set to create an averaged sample set;
calculate at least a first harmonic and a second harmonic based on the averaged sample set;
calculate a first harmonics ratio as a ratio of the first harmonic and the second harmonic; and
compare the first harmonics ratio with a second harmonics ratio to determine an error in the orthogonal distance between the read/write head assembly and the storage medium.

2. The storage device of claim 1, wherein the servo data includes a preamble pattern, wherein the first sample set corresponds to the preamble pattern and a second sample set corresponds to the preamble pattern.

3. The storage device of claim 1, wherein calculating the first harmonic and the second harmonic based on the averaged sample set includes performing a discrete Fourier transform.

4. The storage device of claim 2, wherein the preamble pattern is a 4T preamble pattern, and wherein the averaged sample set includes eight samples.

5. The storage device of claim 2, wherein the first sample set is derived from a preamble pattern in a first sector, and wherein the second sample set is derived from a preamble pattern in a second sector.

6. The storage device of claim 1, wherein the servo based fly-height adjustment circuit includes a digital phase lock loop circuit, wherein the digital phase lock loop circuit adjusts the phase of a sampling clock to synchronize the sampling clock to a received data stream, wherein the first sample set is derived by interpolating samples received before the sampling clock is synchronized.

7. The storage device of claim 6, wherein the second sample set is derived directly from sampling the received data stream using the sampling clock.

8. A method for identifying distance error based on servo data, the method comprising:
providing a first harmonic ratio corresponding to a known position;
providing a storage medium, wherein the storage medium includes servo data;
accessing the servo data from the storage medium using a read/write head assembly, wherein the servo data includes at least a first sample set and a second sample set;
averaging at least the first sample set and the second sample set to create an averaged sample set;
calculating at least a first harmonic and a second harmonic based on the averaged sample set;
calculating a second harmonic ratio as a ratio of the first harmonic and the second harmonic; and
comparing the first harmonic ratio with the second harmonic ratio to determine an orthogonal distance error between the storage medium and the read/write head assembly.

9. The method of claim 8, wherein the first harmonic ratio is calculated during an initialization phase.

10. The method of claim 8, wherein the servo data includes a preamble pattern, and wherein accessing the servo data from the storage medium using a read/write head assembly includes performing an analog to digital conversion where the first sample set corresponds to the preamble pattern and the second sample set corresponds to the preamble pattern are created.

11. The method of claim 8, wherein calculating the first harmonic and the second harmonic based on the averaged sample set includes performing a discrete Fourier transform.

12. The method of claim 10, wherein the preamble pattern is a 4T preamble pattern, and wherein the averaged sample set includes eight samples.

13. The method of claim 10, wherein the first sample set is derived from a preamble pattern in a first sector, and wherein the second sample set is derived from a preamble pattern in a second sector.

14. The method of claim 10, wherein the method further includes:
synchronizing a sampling clock to the servo data; and
wherein the first sample set is derived by interpolating the servo data received before the sampling clock is synchronized.

15. The method of claim 14, wherein the second sample set is derived directly from the servo data sampled using the sampling clock.

16. The method of claim 8, wherein the method further includes:
adjusting a distance from the read/write head assembly to the storage medium such that the distance error is reduced.

17. A servo based fly-height adjustment circuit, the circuit comprising:
a memory, wherein the memory is operable to maintain a first sample set corresponding to a first portion of a preamble pattern;
a second sample set corresponding to a second portion of the preamble pattern;
an interpolation circuit, wherein the interpolation circuit is operable to interpolate the first sample set to a phase position approximately equivalent to the second sample set;
a sample averaging circuit, wherein the sample averaging circuit is operable to receive at least the first sample set and the second sample set, performs an averaging calculation, and to provide an averaged sample set;
a discrete Fourier transform circuit that is operable to receive the averaged sample set and to calculate at least one harmonic; and
a comparator, wherein the comparator is operable to compare the at least one harmonic with a previously calculated harmonic value to yield an orthogonal distance error between a storage medium and a read/write head assembly.

18. The circuit of claim 17, wherein the at least one harmonic is a first harmonic, wherein the discrete Fourier transform circuit further calculates a second harmonic, wherein the previously calculated harmonic value is a previously calculated harmonics ratio, and wherein the circuit further includes:
  a harmonics ratio calculator, wherein the harmonics ratio calculator is operable to calculate a newly calculated harmonics ratio of the first harmonic to the second harmonic; and
  wherein comparing the at least one harmonic with the previously calculated harmonic value includes comparing the newly calculated harmonics ratio to the previously calculated harmonics ratio.

19. The circuit of claim 18, wherein the circuit further comprises:
  a phase lock loop circuit, wherein the phase lock loop circuit is operable to synchronize a sampling clock to the servo data, wherein the first sample set corresponding to the preamble pattern is obtained before the sampling clock is synchronized.

20. A system for fly height adjustment, the system comprising:
  a servo based fly-height adjustment circuit operable to:
    receive at least a first sample set corresponding to servo data derived from a storage medium and a second sample set corresponding to the servo data derived from the storage medium via a read/write head assembly,
    average at least the first sample set and the second sample set to create an averaged sample set;
    calculate at least a first harmonic and a second harmonic based on the averaged sample set;
    calculate a first harmonics ratio as a ratio of the first harmonic and the second harmonic; and
    compare the first harmonics ratio with a second harmonics ratio to determine an error in the distance between the read/write head assembly and the storage medium.

21. The system of claim 20, wherein the system is implemented as part of an integrated circuit.

22. The system of claim 20, wherein the servo data includes a preamble pattern.

23. The system of claim 22, wherein calculating the first harmonic and the second harmonic based on the averaged sample set includes performing a discrete Fourier transform.

24. The system of claim 22, wherein the preamble pattern is a 4T preamble pattern, and wherein the averaged sample set includes eight samples.

25. The system of claim 22, wherein the first sample set is derived from a preamble pattern in a first sector, and wherein the second sample set is derived from a preamble pattern in a second sector.

26. The system of claim 25, wherein the servo based fly-height adjustment circuit includes a digital phase lock loop circuit, wherein the digital phase lock loop circuit adjusts the phase of a sampling clock to synchronize the sampling clock to a received data stream, wherein the first sample set is derived by interpolating samples received before the sampling clock is synchronized.

* * * * *